US008104153B2

(12) United States Patent
Scruggs

(10) Patent No.: US 8,104,153 B2
(45) Date of Patent: Jan. 31, 2012

(54) NON-HORIZONTAL BURIAL METHODS

(76) Inventor: Donald E. Scruggs, Chino, CA (US)

( * ) Notice: Subject to any disclaimer, the term of this patent is extended or adjusted under 35 U.S.C. 154(b) by 0 days.

(21) Appl. No.: 12/587,829

(22) Filed: Oct. 14, 2009

(65) Prior Publication Data

US 2010/0031483 A1 Feb. 11, 2010

Related U.S. Application Data

(62) Division of application No. 11/477,236, filed on Jun. 28, 2006, now Pat. No. 7,631,404.

(51) Int. Cl.
*A61G 17/00* (2006.01)
*A01N 1/00* (2006.01)

(52) U.S. Cl. ............ 27/21.1; 27/2; 27/11; 27/19; 27/35

(58) Field of Classification Search .......... 27/21.1–23.1; 52/128–142
See application file for complete search history.

(56) References Cited

U.S. PATENT DOCUMENTS

| | | | | |
|---|---|---|---|---|
| 2,942,323 | A * | 6/1960 | Strickland | 27/21.1 |
| 3,348,280 | A * | 10/1967 | Myers | 27/2 |
| 3,898,718 | A * | 8/1975 | Eubank | 27/35 |
| 3,918,133 | A * | 11/1975 | Schmitz | 27/2 |
| 4,780,940 | A * | 11/1988 | Jay | 27/28 |
| 5,127,112 | A * | 7/1992 | Brock | 27/1 |
| 5,715,583 | A * | 2/1998 | Sandoval | 27/11 |
| 6,625,852 | B1 * | 9/2003 | Hanson | 27/2 |
| 6,629,321 | B1 * | 10/2003 | Hunt et al. | 5/2.1 |
| 7,127,783 | B1 * | 10/2006 | Poole et al. | 27/1 |
| 7,200,906 | B2 * | 4/2007 | Darst et al. | 27/2 |
| 7,636,991 | B1 * | 12/2009 | Scalisi, III | 27/1 |
| 7,703,186 | B1 * | 4/2010 | Williamson | 27/2 |
| 2006/0128269 | A1 * | 6/2006 | Choi | 446/476 |

FOREIGN PATENT DOCUMENTS

WO WO 2004100849 A2 * 11/2004

* cited by examiner

*Primary Examiner* — Leslie Deak
*Assistant Examiner* — Susan Su

(57) ABSTRACT

Process methods of interring remains non-horizontally into earth, sand, snow or other receiving materials on dry or wet land or under water in a much less labor intensive manner while using far less land area than currently practiced.

3 Claims, 4 Drawing Sheets

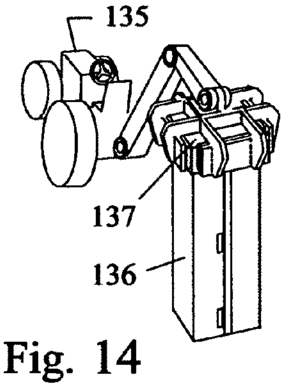
Fig. 14
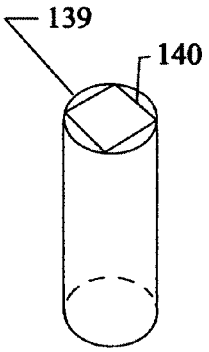
Fig. 15
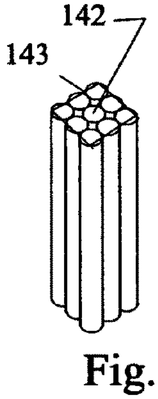
Fig. 16
Fig. 17
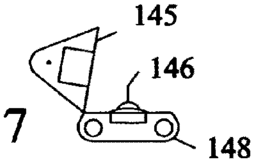
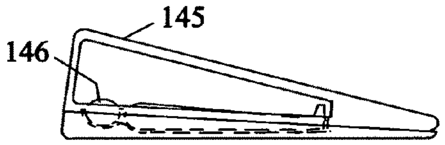
Fig. 18
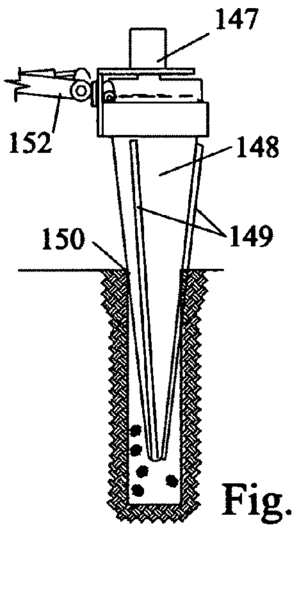
Fig. 19
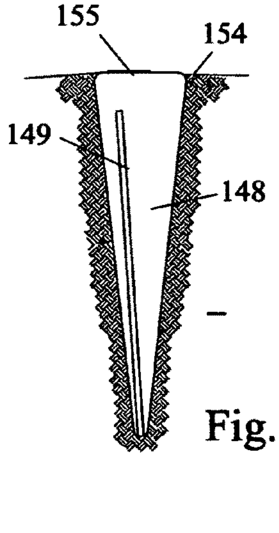
Fig. 20
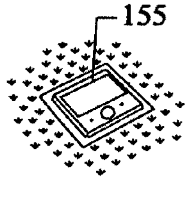
Fig. 21

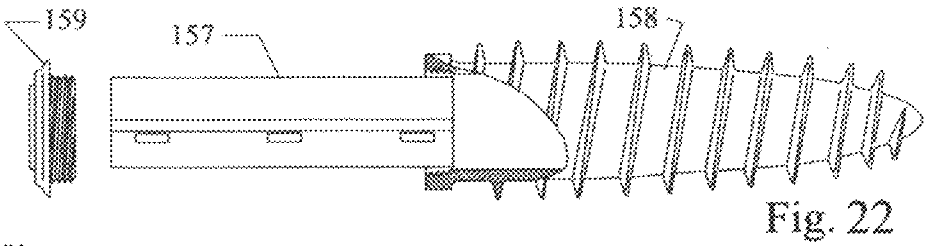
Fig. 22
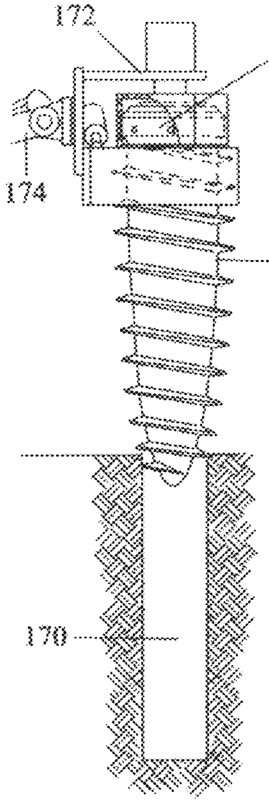
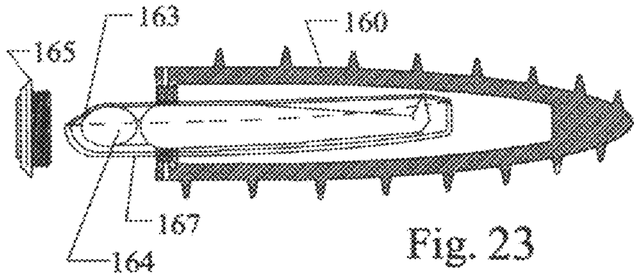
Fig. 23
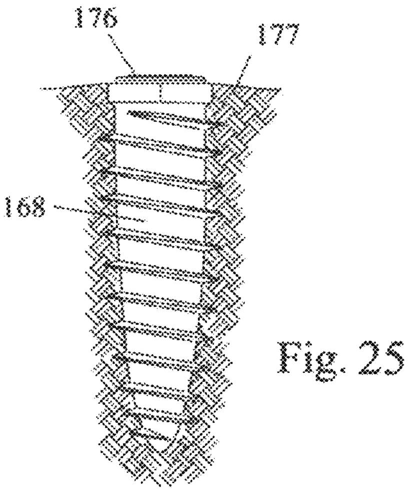
Fig. 25
Fig. 24
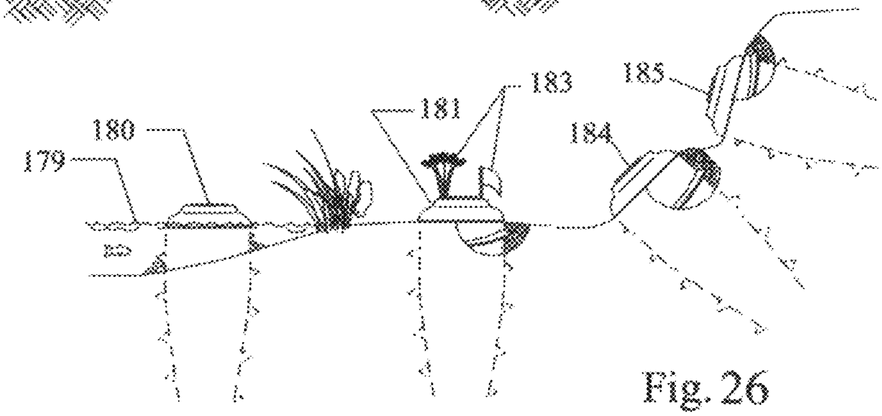
Fig. 26

NON-HORIZONTAL BURIAL METHODS

CROSS-REFERENCE TO RELATED APPLICATIONS

Division of Easy Inter Burial Container, Ser. No. 11/477,236 of Jun. 28, 2006 now U.S. Pat. No. 7,631,404.

FEDERALLY SPONSORED RESEARCH

Not Applicable

SEQUENCE LISTING OR PROGRAM

Not Applicable

FIELD OF THE INVENTION

This invention relates to conserving land area by using easy to install non-horizontal burial containers which can be screwed or self bored into earth or other receiving materials and do not require a large amount of land area or the large pre-dug rectangular holes in current practice.

BACKGROUND OF THE INVENTION

A common current interment practice is to first move a body to a mortuary where it is prepared for funeral services. In cases where a body is unclaimed, it is usually provided with minimum preparation and burial, paid for by public funds. A claimed body, after mortuary preparation, is usually placed in an ascetically pleasing casket and either displayed in an open casket funeral service or the casket alone is visible in a closed casket service. Often, after an indoor service the body and casket are moved to a prepared grave site in a cemetery, where a final service is performed.

At the prepared grave site the casket containing the body is set either on or in a box like crypt during a grave side funeral service, if one is conducted. None of these burial services need be changed for a Non-Horizontal Burial Method interment. Several types of Non-Horizontal Burial Method containers are designed to be set on floral or otherwise decorated boxes for open or closed casket funeral services in an in door or out door environment.

Currently the prepared grave is often a rectangular excavation approximately four feet wide by seven and a half feet long by six and a half feet deep. Walkways are left on all sides of the grave for later visitors, making a total of over 50 square feet of ground area to be set aside for each grave. A Non-Horizontal Burial Method interment process requires only about one third of the land area used for current burials.

The removed earth or other receiving material from the current-type grave excavation is usually piled next to the grave site and covered during a grave side funeral service, if one is conducted. After funeral services, the casket and or box like crypt is lowered to the bottom of the prepared grave excavation and the removed receiving material is shoveled back into the excavation. In a Non-Horizontal Burial Methods interment there is not a large volume of earth or receiving material to dig out and later replace, as from a current type grave excavation.

In current type burials, the removed receiving material is replaced and continuously tamped to slightly above the ground level of the excavation to reduce later settling and the showing of a depression. The extra material, left over because of the displacement of the coffin and or box like crypt, is hauled away. Ground cover, such as grass, is then restored over the site. In a Non-Horizontal Burial Methods burial, the receiving material from a far smaller hole is all that is left over and can be easily removed or scattered lightly over the surrounding area.

In current type burials, additional digging and preparation is often undertaken to provide for the installation of a headstone, plaque marker or monument and the installation of flower and flag receptacles for persons to later pay respects and honor the deceased. Provisions for plaques, markers, monuments, flower receptacles and flag receptacles are regularly built into Non-Horizontal Burial Method burial containers. With an eye to future grave site maintenance, a number of tops and end pieces, which will show at the grave site, are made very low to insure power mower clearance and some even have small channels around their outside edges for weed killer to mitigate the normal encroachment of the cemetery's ground cover.

Cemetery properties are usually selected and developed in costly, but pleasant areas with level and softer earth or other receiving materials. Roads, landscaping, fences, monuments, statues, trees, ponds and other items are added for utility and aesthetics. The cost of each grave site, and thus each burial, is relative to the number of grave sites on the developed cemetery property. The future business of a cemetery is based not only on maintenance of filled graves, but on the number of empty grave sites remaining within the cemetery. With the Non-Horizontal Burial Methods process a cemetery has about three times the grave sites as in current practice. In addition to interment in flat ground, Non-Horizontal Burial Method containers can be readily installed in ponds, steeply sloped land and very near to trees, adding greatly to the available grave site total in a cemetery.

The labor currently required to prepare a grave, perform a burial and return a site to a finished condition adds significantly to the high cost of each burial. The Non-Horizontal Burial Methods process eliminates the need for a large rectangular excavation, extensive refilling, and the later excavation for installation of markers and plaques.

The Non-Horizontal Burial Methods process reduces the cost of each grave site and each burial and approximately triples the business potential for each existing and new cemetery.

OBJECTS OF THE INVENTION

It is a main object of this invention to greatly reduce the cost of each grave site by significantly reducing the land area required for each burial as well as reducing the amount of excavation and replacement of the receiving material for each burial.

It is a further object of this invention to greatly reduce the labor currently required to finish a grave site after interment by reducing replanting of ground cover and providing for plaque, monument, flag and flower placement as an integral part of the burial container.

An additional object of this invention is to provide for the use of less expensive land for grave sites by providing a means to inter bodies in horizontal, sloping or near vertical land surfaces not currently used.

It is another object of this invention to provide for interment in ponds and other underwater locations.

OPERATING PRINCIPALS AND PREFERRED EMBODIMENT

The preferred embodiment of this invention is a process method where, following mortuary preparations, the body is placed inside a lavish display casket for a funeral service and after the service, the body is placed in a form fitting body tray and secured tightly to the body tray by a securely attached body retaining shroud device. The body, tray and body retaining shroud device are then placed within a non-horizontal burial container having a strong hull, tapered toward the foot end, with a wrench drivable head end, and power equipment is used to make the interment.

A drilling auger, such as those commonly used on a power-take-off attached on the working arm of a tractor-backhoe type vehicle, is often used to bore a pilot hole in the direction of the intended interment. The depth of this hole is usually about one-third the length of the non-horizontal burial container and less than half its diameter, depending upon the type and condition of the earth or receiving material in which the burial is to be made. Water is often added to the hole to aid the earth or receiving material to displace and more readily pack back around the burial container, as well as help lubricate the passage of the burial container.

A vehicle then manipulates a gripping, rotating and revolving device over and around the burial container. Once the gripping device or socket wrench tool is properly fitted onto the upper portion of the burial container, the burial container is set in place and revolved for interment.

One variation is to use a non-horizontal burial container made to look like a currently used coffin or casket. This natural looking coffin or casket is used for display of the body during funeral services. The body is set into a form fitting body tray disguised under a layer of currently used cloth, inside the coffin or casket. After funeral services, the body is secured with a form fitting body retaining shroud device. If the coffin or casket is sturdy enough a tapered exterior foot piece, with blades, is attached and the entire unit and its contents are lifted at the headpiece and manipulated, as illustrated in a number of figures herein, to effect satisfactory interment into a receiving material. This design bores its own final hole.

Another self boring type of burial container is split lengthwise, like a current casket so it can be used in conventional funeral services. It has blades extending outward from the tapered hull to approximately the diameter of the largest end of the burial container and has cutting edges on the lower end of these blades. During funeral services the burial container, especially the blades are covered with an attractive cloth.

Another process method is to use a screw-in type burial container. In this method regular funeral services are conducted and, following the services, the body is secured within the screw-in container, with or without a body tray and body retaining shroud device. A device, mounted on a vehicle, then picks up the container, maneuvers it to the interment location, rotates it into the intended interment position and revolves it in the correct direction for the screw threads to pull it into a receiving material. A larger screw-in burial container is used to receive a current type casket or coffin, containing a body, as shown herein, and a device mounted on a vehicle performs the handling and interment, as above.

A regular casket or coffin vertically interred, as shown herein, also meets the parameters of the Non-Horizontal Burial Method process.

Also shown herein are several types of tapered self boring or pilot hole reaming non-horizontal burial containers used as a part of a Non-Horizontal Burial Method process.

DESCRIPTION OF FIGURES

FIG. 14 shows a powered vehicle, 135, with a gripping and maneuvering device, 137, holding a conventional looking casket or coffin, 136, in a vertical position.

FIG. 15 is that of a bored or augered hole, 139, with the dimensions, 140, of a conventional casket or coffin, such as that shown in FIG. 14, illustrating the relationship of such a hole and a casket or coffin. The casket or coffin shown as item 136 in FIG. 14 would be set vertically into the hole, 139, and some of the removed receiving material would be tamped in around the casket or coffin as a Non-Horizontal Burial Method.

FIG. 16 shows a series of smaller bores or augers, 142, forming satisfactory hole dimensions, 143, for interring a casket or coffin as shown in FIG. 14 as item 136.

FIG. 17 is an end view of a triangular cross section coffin with its upper section, 145, opened away from its lower section, 148, showing a body, 146, being used in a regular funeral service. Note that the interior of the coffin is of a general body shape and the addition of a secured body retaining shroud device totally retains the body.

FIG. 18 is a side view of the triangular cross section coffin shown in FIG. 17, with its upper section, 145, open to display a body, 146.

FIG. 19 shows a coffin, 148, such as that shown in FIG. 18, with cutting blades, 149, added, being revolved in an augered hole, 150, by a gripping, maneuvering and rotating device, 147, which is being operated from the end of an arm, 152, on a vehicle.

FIG. 20 is a view of the coffin, 148, from FIG. 19, with the receiving material cut away to show the cutting blades, 149, the top surface of the receiving material, 154, and the top of the Non-Horizontal Burial container, 155.

FIG. 21 is a perspective view of a typical Non-Horizontal Burial Method interment, showing the finished grave site with a top, 155, having a memorial plaque, as well as flower and flag holders.

FIG. 22 is a side view of a large screw-in burial container, 158, with its head section cut away to show a currently used type of casket or coffin, 157, being placed inside, and having a screw-in cap, 159, which will seal the large screw-in burial container.

FIG. 23 is a cutaway side view of a screw-in, non-horizontal burial container, 160, smaller than that shown in FIG. 22, into which is being placed a body, 164, in a body tray, 167, enclosed securely by a body retaining shroud device, 163, and having a screw-in end cap, 165, which will seal the container.

FIG. 24 is a side view of a screw-in non-horizontal burial container, 168, being held and revolved into an augered hole, 170, by a device, 172, on the arm of a vehicle, 174, through a socket wrench on the shaped head, 167, of the burial container.

FIG. 25 is a side view of the non-horizontal burial container, 168, shown in FIG. 24, now totally interred, with its top cap, 176, showing above the receiving material, 177.

FIG. 26 shows a series of Non-Horizontal Burial Method containers, in this case screw-in types, with a marker plaque top, 180, showing above pond water, 179, on a container interred in a pond, and a marker plaque top, 181, having flowers and a flag, 183, on a container interred vertically, and a marker plaque top, 184, on a container interred at an angle at the base of a slope, and a marker plaque top, 185, on a container interred into the side of a steep slope.

Figure 1:
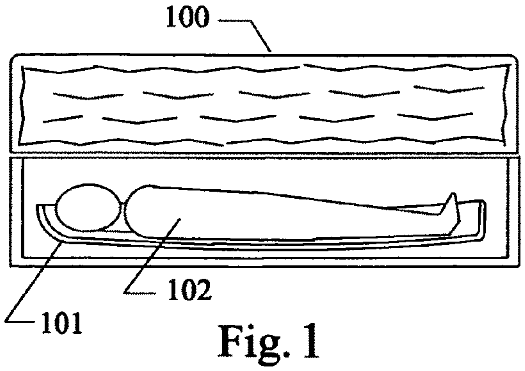
FIG. 1 is a cut-away view of a body, 102, resting in a body tray, 101, inside a regular, currently used casket or coffin, with the lid, 100, in an open position.
Figure 2:
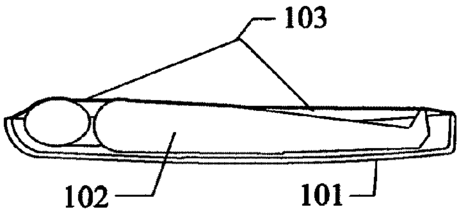
FIG. 2 shows a cut-away view of the body, 102, and body tray, 101, from FIG. 1, where a body retaining shroud device, 103, has been fitted over the body and tightly secured to the body tray.
Figure 3:
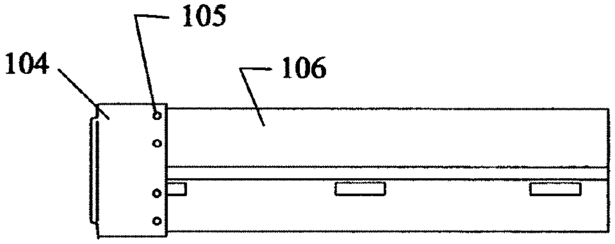
FIG. 3 is an outside view of the casket or coffin, 106, from FIG. 1, in a closed position and with the head end cap, 104, from FIG. 4, attached with hardware, 105, over both the upper and lower sections of the casket or coffin.
Figure 4:
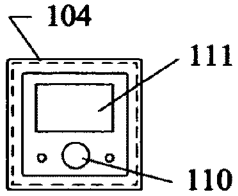
FIG. 4 is an end view of a head end cap, 104, pointing out its marker plaque area, 111, and its flower cup holder, 110. Smaller holders for flags are shown but not marked by number.
Figure 5:
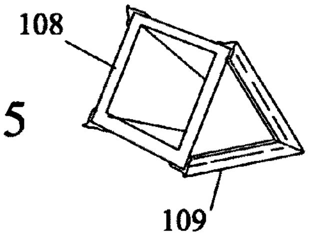
FIG. 5 is a perspective view of a pyramidal shaped boring nose showing its structure, 108, and a cutting edge, 109.
Figure 6:
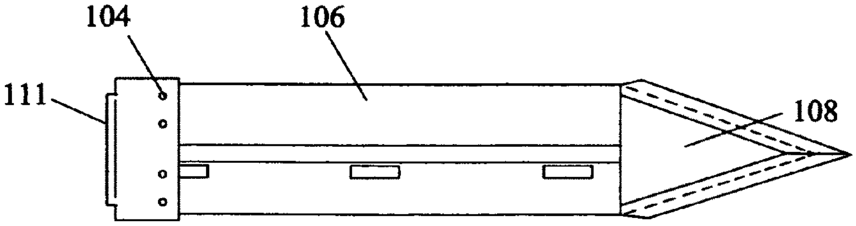
FIG. 6 is a side view of the casket or coffin, 106, from FIG. 3, with the head end cap, 104, from FIG. 4, and the pyramidal boring nose, 108, from FIG. 5, attached, making it into a Non-Horizontal Burial Method unit.
Figure 7:
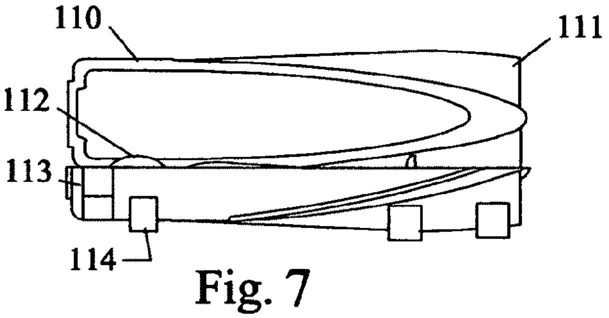
FIG. 7 is a view of an open self boring burial container being used in a funeral service, showing a body, 112, an open upper section, 110, with curved cutting blades, 111, and a lower section, 113, with mounting blocks, 114, to hold it in position for funeral services. Cloth and disguise draperies are not shown.
Figure 8:
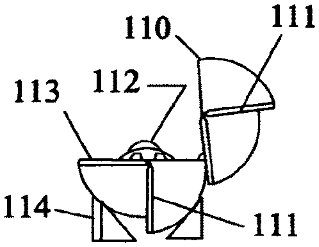
FIG. 8 is an end view of the unit shown in FIG. 7 pointing out a body, 112, an open upper section, 110, with curved cutting blades, 111, and a lower section, 113, also with curved cutting blades, 111, and showing mounting blocks, 114, to hold it in position for funeral services.
Figure 9:
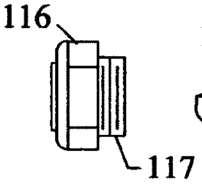
FIG. 9 is a side view of a screw-in end cap pointing out its flats, 116, for socket wrench revolving of the burial container during interment, and its screw threads, 117, which match the internal threads in the container shown in FIG. 10.
Figure 10:
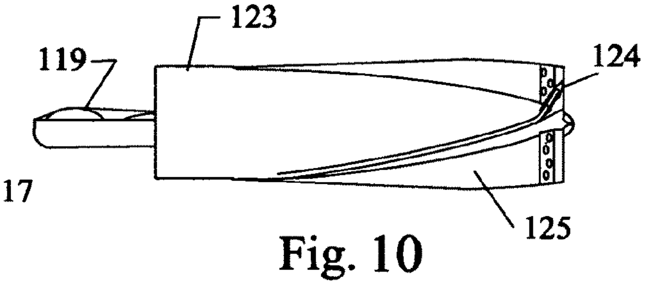
FIG. 10 is a side view of a single piece hull, 123, self digging burial container with curved blades, 125, to move the cut-away receiving material up out of the hole, and added on cutting blade edges, 124, with a body, body tray and body retaining shroud device, 119, inserted into the container. A body would be moved to this type of Non-Vertical Burial Method container after a funeral service such as shown in FIG. 1.
Figure 11:
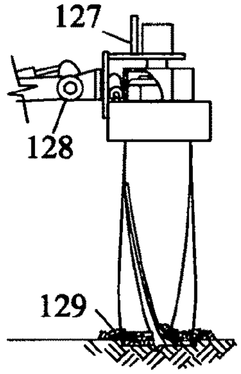
FIG. 11 shows a self boring or digging burial container, such as shown in FIG. 7 or FIG. 10, being gripped and revolved by a device, 127, which is on the end of a vehicle arm, 128, with the blades on the foot end of the burial container just beginning to remove receiving material, 129.
Figure 12:
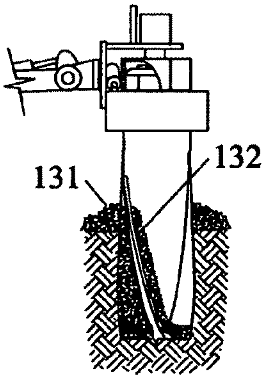
FIG. 12 shows the same unit as in FIG. 11 with a larger amount of receiving material, 131, around the hole being dug by the container and with newly cut-away receiving material, 132, being guided upward by the curved blades on the container.
Figure 13:
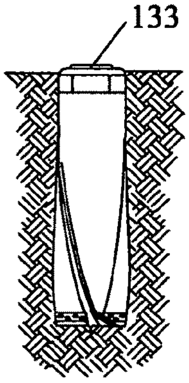
FIG. 13 shows the same unit as in FIG. 12 in its final interred position and with the excess receiving material removed and pointing out its marker plaque, 133.

I claim:

1. A non-horizontal burial process comprising:

placing a body in a form fitting body tray;

securing the body tightly to the body tray with a body retaining shroud device;

inserting the body, body tray and body retaining shroud device into a non-horizontal interment burial container, wherein the container comprises a tapered foot end and a wrench-drivable head end, the container further comprises blades extending substantially the entire length dimension along an outside surface of the container;

picking up and maneuvering the container into a non-horizontal position in a receiving material such that only a top surface of the head end is showing above the receiving material.

2. A non-horizontal burial process comprising:

displaying a body in a form fitting body tray within a non-horizontal burial container for a funeral service;

following the funeral service, securing the body tightly to the body tray with a body retaining shroud device;

drilling a pilot hole in a receiving material, wherein the depth of the hole is less than the length of the container and the diameter of the hole is less than the diameter of the container;

picking up and maneuvering the container to a non-horizontal position over the hole;

revolving the container inside the hole such that the container bores into the receiving material until only a to end of the container is exposed.

3. A non-horizontal burial process comprising:

displaying a body in a form fitting body tray within an opened non-horizontal interment burial container for a conventional funeral service, wherein the container comprises curved blades extending substantially in a longitudinal direction along an outside surface of the container;

securing the body to the body tray with a body retaining shroud device;

picking up and maneuvering the container to a non-horizontal position a receiving material;

boring the container into the receiving material by revolving the container, such that the curved blades guide newly cut-away receiving material up and out of a hole into which the container rests.

* * * * *